United States Patent Office 3,096,208
Patented July 2, 1963

3,096,208
COATING MOLDED AMINOPLAST ARTICLES WITH POLYUREAS
Arthur S. Nyquist, Darien, and Arnold D. Myers, Wallingford, Conn., assignors to American Cyanamid Company, New York, N.Y., a corporation of Maine
No Drawing. Filed Mar. 31, 1961, Ser. No. 99,731
20 Claims. (Cl. 117—138.8)

This invention relates to a novel method of imparting resistance to stains, particularly those made by coffee and tea, to heat- and pressure-consolidated articles prepared from aminoplast resinous compositions. This invention also relates to the stain-resistant articles themselves, such as molded tableware articles, produced according to our novel method, and further relates to the stain-retarding compositions used in preparing such articles.

The many excellent properties possessed by aminoplast resins, and in particular by aminotriazine-aldehyde resins such as melamine-formaldehyde resins, have led to their especially widespread use in the molding and laminating fields. More particularly, these thermosetting or heat-hardenable resins possess, in the cured or hardened state, superior break-resistance, resistance to water and other solvents, to softening or other internal heat-failure, to cracking when exposed to electrical stress, and to surface failures such as loss of gloss, discoloration or crazing due to heat and light.

However, heat- and pressure-consolidated articles prepared from aminoplast resins such as melamine-formaldehyde resins do possess one deficiency which detracts from their overall execellence. Articles of this type are susceptible to various kinds of stains. Coffee and tea are among the worst offenders in this respect, but other substances, for example, cocoa, soft drinks (e.g., cola drinks), the juices of various fruits (e.g., raspberry, grape, etc.), and vegetables, and the like, also leaves stains which detract from the appearance, although not the wearability, of such molded and laminated articles, and which are difficult to remove even if attended to immediately.

Due chiefly to this propensity for staining, many people, but especially restaurateurs, have been reluctant to replace chinaware with high-quality tableware made from, for example, melamine-formaldehyde resinous compositions, despite the latter's many obviously superior properties.

It is, therefore, an object of our invention to provide heat- and pressure-consolidated articles prepared from aminoplast resinous compositions, and particularly from melamine-formaldehyde resinous compositions, which are extremely resistant to staining by common foods and beverages.

It is also an object of our invention to provide a novel method of imparting stain-resistance to heat- and pressure-consolidated articles prepared from aminoplast resinous compositions, and particularly from melamine-formaldehyde resinous compositions.

A further object of our invention is to provide stain-retarding compositions of matter useful in imparting excellent stain resistance to heat- and pressure-consolidated articles prepared from aminoplast resinous compositions, and particularly from melamine-formaldehyde resinous compositions.

These and other objects of our invention will be discussed more fully hereinbelow.

We have now discovered, quite unexpectedly, that compositions of matter comprising the resinous reaction products of ingredients comprising (1) one or more isomers of toluene diisocyanate, or a mixture of such isomers, and (2) water, sometimes referred to as polyureas, dissolved in a suitable organic solvent, may be used to coat the surfaces of heat- and pressure-consolidated articles prepared from aminoplast resinous compositions such as melamine-formaldehyde resinous compositions to impart stain-resistance thereto.

Among the suitable toluene diisocyanates which may be employed in preparing our stain-retardant resinous compositions are the individual isomers, e.g., 2,4- and 2,6-toluene diisocyanate, and mixtures of such isomers. For the sake of convenience, all the isomers of toluene diisocyanate, or mixtures thereof, will be referred to hereafter as "toluene diisocyanate." Strangely enough, not all organic polyisocyanates, in fact, not even all of those conventionally employed in the preparation of resinous polyureas, will give resinous reaction products which may be used as stain-resistant coatings. For example, resinous reaction products preared from isocyanates such as methylene bis (4-phenyl isocyanate) and xylylene diisocyanate have proven to be ineffective in imparting stain-resistance to heat- and pressure-consolidated articles prepared from aminoplast resinous compositions.

Although the use of a catalyst is not essential in preparing our polyurea resin coatings, any of the catalysts conventionally employed in the preparation of polyureas may be used, if desired, to facilitate the reaction. Among such catalysts there are included nitrogeneous bases such as the N-alkylmorpholines, e.g., N-methylmorpholine, N-ethylmorpholine, and the like, tertiary amines such as triethylamine, pyridine, N,N'-dimethylpiperazine, tetraalkylguanidines such as tetramethyl- and tetraethylguanidine, alkylene polyamines such as triethylene diamine, and the like. Amounts of catalyst ranging from about 0.5% to 2.0% by weight, based on the total weight of toluene diisocyanate and water present, may be employed.

The amounts of reactants used in preparing our polyurea resin coatings may be varied within rather wide limits. For example, from about 2–6 mols of toluene diisocyanate per mol of water may be employed, with from about 4–6 mols of toluene diisocyanate per mol of water constituting the preferred mol ratio.

As an illustration of the type of polyurea resinous reaction products prepared from amounts of reactants within the above-stated range, the polyurea prepared from two mols of 2,4-toluene diisocyanate and one mol of water, is N,N'-bis-,4-methyl-3-isocyanato) phenylurea, represented by the structural formula

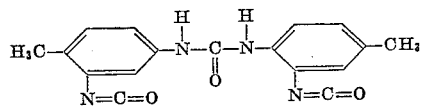

The most suitable method we have found for preparing our stain-retardant resinous compositions comprises the following steps:

(1) Heating the selected toluene diisocyanate(s), either alone or together with a catalyst, to a temperature of between about room temperature and 100° C.

(2) Adding the water dropwise, with stirring, at a rate such that a very strong exotherm will be avoided, e.g., at a rate such that the temperature of the reaction mixture will be maintained at from about 80 to 90° C.

(3) Once the addition of the water is complete, cooling the reaction mass to room temperature (about 25° C.).

(4) Dissolving the resinous reaction mass in a suitable organic solvent.

It should be noted at this point that the procedure outlined above for the preparation of our stain-retardant resinous compositions merely represents the preferred method of preparation, and should not be considered a limitation on our inventive concept. Any suitable means of preparing stain-retardant resinous compositions from the essential ingredients (toluene diisocyanate and water) may be employed without detracting from the spirit and scope of our invention. Similarly, any suitable organic solvent may be employed to dissolve the resinous reaction mass in order to render it easily applicable to the surfaces being treated. Among such solvents are included methyl isobutyl ketone, dimethyl formamide, dioxane, butyl acetate, chlorobenzene, in short, any inert organic solvent which contains no active hydrogen. Generally, the amount of solvent employed will be such that the resinous reaction mass will be present in solution at a solids content ranging from about 5 to 25% by weight.

Another feature of our invention which is certainly not critical in its broader aspects is the method of applying our novel stain-retarding resinous compositions to the surfaces of heat- and pressure-consolidated aminoplast articles. Any suitable method of application, e.g., dipping, spraying brush- or roller-coating, and the like, may be employed.

The thickness of the coating applied will depend on many factors inherent in the coating process itself, such as the viscosity of the treating solution, the time of contact, and the like, and will also depend on the thickness of coating desired. Stain-resistance can be obtained from coatings of a fraction of a mil in thickness. However, depending on the amount of abrasion resistance required of the coated article, coatings of from about 0.5–5 mils or higher will be applied, with thicknesses nearer the upper limit providing adequate abrasion resistance. Parenthetically, it should be noted here that we believe that the benefit incurred by the use of our polyurea resinous compositions may possibly be derived from the reaction of free isocyanate groups contained therein with certain sites or groups of atoms in the heat- and pressure-consolidated aminoplast articles, which sites have remained chemically active despite the fact that the articles have undergone a curing cycle, but we do not wish to be bound by any particular theory or mechanism advanced to explain our novel concept.

In order to complete our novel and efficacious treatment, the coated article is first air dried, until the inert organic solvent has evaporated, and then placed in an air oven and heat-treated at temperatures ranging from about 50° C. to 150° C. for from about 2 to 20 minutes. The air drying time may be accelerated, if desired, e.g., by the use of suitable driers or by applying the coating to the heat- and pressure-consolidated aminoplast article as it comes from the mold.

As is well known, aminoplant resins are synthetic resins prepared by the condensation reaction of an amino (including imino) or amido (including imido) compound with an aldehyde, a typical example being melamine-formaldehyde resins. Aminoplast resins of the type which may be used in the preparation of heat- and pressure-consolidated articles treated in accordance with the present invention have been shown, for example, in U.S. Patents Nos. 2,197,357; 2,310,004 and 2,328,592 to Widmer et al. and in U.S. Patent No. 2,260,239 to Talbot. The present invention is concerned particularly with the treatment of molded or laminated articles prepared from aminoplast resins which the condensation products of ingredients comprising an aldehyde, e.g., formaldehyde and an aminotriazine containing at least one hydrogen atom and preferably two hydrogen atoms attached to the amidogen nitrogen atom.

We prefer to treat molded or laminated articles prepared from aldehyde-aminotriazine resinous compositions which are heat curable or potentially heat curable resinous reaction products of ingredients comprising melamine and formaldehyde. However, molded or laminated articles prepared from other heat curable or potentially heat curable aldehyde-aminotriazine resinous reaction products may also be employed. Aminotriazines containing at least two amidogen groups, each having at least one aldehyde-reactable hydrogen atom attached to the amidogen nitrogen atoms, which may be reacted with an aldehyde in preparing the ultimate product to be treated in accordance with our invention include, among others, the triamino-s-triazines represented by the structural formula:

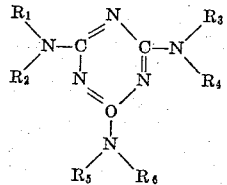

wherein any of $R_1$ to $R_6$ may be hydrogen, alkyl, cycloalkyl, alkenyl, cycloalkenyl, aryl, aralkyl, alkaryl, hydroxyalkyl, alkoxyakyl, amino or substituted amino (e.g., alkylamino, dialkylamino, etc.), with the proviso that in at least two of the amidogen substituents directly attached to the carbon atoms of the triazine nucleus at least one R is hydrogen. An illustrative but by no means exhaustive enumeration of such amino-s-triazines includes the following: 2-amino-R-amino-4,6-diamino-s-triazines such as the N-methyl, N-butyl, N-phenyl, N-tolyl and N-cyclohexyl melamines; 2,4,6,-tris (mono-R-amino)-s-triazines such as 2,4,6-tris (methylamino)-s-triazine; 2-di-R-amino-4,6-bis (mono - R - amino) - s - triazines such as 2-dimethylamino-4,6-bis (methylamino)-s-triazine; the methylolmelamines, such as mono-, di-, and trimethylolmelamines, $N^2$ - dimethylol - $N^4,N^6$ - bis (methylol) - melamine; hydrazino-s-triazine, such as 2,4,6- trihydrazino-s-triazine; and the like.

Another suitable class of aminotriazines comprises the diamino-s-triazines represented by the structural formula:

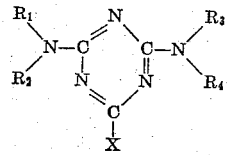

wherein each of $R_1$ to $R_4$ have the same meaning as given above and in which X is hydrogen, hydroxy, alkyl, cycloalkyl, alkenyl, cycloalkenyl, aryl, aralkyl, alkaryl, hydroxyalkyl or alkoxyalkyl, again with the proviso that in each of the amidogen substituents directly attached to the carbon atoms of the triazine nucleus at least one R is hydrogen.

Illustrative of this class of s-triazines are the following: guanamines, such as formoguanamine, acetoguanamine, caprylguanamine, methacryloguanamine, sorboguanamine, adipoguanamine, sebacoguanamine, $\Delta^3$-tetrahydrobenzoguanamine, hexahydrobenzoguanamine, benzoguanamine, phenylacetoguanamine, diphenyladipoguanamine; ammeline, and the like.

We may also employ other amido or imido compounds besides the aminotriazines in the preparation of heat- and pressure-consolidated articles to be treated in accordance with the present invention. For example, we may employ urea, as well as those of its derivatives which have been commonly used in the preparation of aminoplast resinous compositions, such as, for example, the alkylureas, such as mono- and dimethylurea, haloureas, and the like, again with the proviso that at least two hydrogen atoms are attached to amidogen nitrogen atoms.

Any suitable aldehyde may be utilized as a reactant with the amino or amido compound in preparing the aminoplast resin. We prefer to employ formaldehyde, either as such or as an aqueous solution. Other aldehydes such as, for example, acetaldehyde, propionaldehyde, butyraldehyde, benzaldehyde, furfural; mixtures thereof, or mixtures of formaldehyde with other such aldehydes may be employed. Paraformaldehyde, hexamethylenetetramine, trioxymethylene, paraldehyde, or other compounds engendering aldehydes may also be employed.

The properties desired in the finished product and economic considerations are among the features which will determine the choice of the particular aldehyde and aminotriazine employed.

Processes for the preparation of heat- and pressure-consolidated articles, i.e., moldings and laminates, from aminoplast resinous compositions are so well known in the art that no further mention need be made of them here, except to say that said aminoplast compositions may be used with any conventional material, e.g., α-cellulose paper, cellulosic fabrics, silk, glass cloth, rayon, nylon, or other synthetic fabrics, and the like, in the preparation of laminates, and also that said compositions may have incorporated therewith for molding purposes fillers, such as asbestos, mica, sand, ground cork, chopped glass fibers, and the like, mold lubricants, such as zinc stearate, and the like, curing catalysts, etc.

In order that those skilled in the art may more fully understand the inventive concept presented herein, the following illustrative examples are set forth. These examples are given solely by way of illustration and should not be considered as expressing limitations unless so set forth in the appended claims. All parts and percentages are by weight, unless otherwise stated.

*Example I*

522 parts of toluene diisocyanate (a mixture of 80% by weight of the 2,4-isomer and 20% by weight of the 2,6-isomer) were mixed together with 8 parts of N-methyl morpholine in a suitable reaction vessel equipped with thermometer, stirrer, and reflux condenser, and heated to 80° C. At this point, 18 parts of water were added dropwise with stirring, the rate of addition being adjusted so as to prevent a strong exotherm, while maintaining the reaction temperature at 80–90° C. When the addition of water was complete, the reaction mass was cooled to room temperature.

In order to show the excellent stain-resistance imparted to melamine-formaldehyde moldings by this resinous material, a 10% solution of the resinous product in methyl isobutyl ketone was prepared and applied to test moldings prepared from a commercially available cellulose-filled melamine-formaldehyde molding composition (see U.S. Patent No. 2,773,788). After application, the pieces were air dried to evaporate the solvent and then placed in an air oven at 80° C. for 10 minutes. The treated pieces were then exposed to a strong brew of black coffee, prepared by dissolving 32 grams of Nescafé Instant Coffee in one liter of boiling water and cooling the solution to 80° C. The solution was maintained at 80° C. during the test. The test pieces were immersed in the coffee solution and removed periodically for examination. After immersion for a period of 72 hours, the treated pieces were removed from the coffee solution, washed with soap and water, and dried. They showed no substantial change in color. Untreated pieces which were similarly exposed to the coffee solution became highly discolored in the same amount of time, due to staining by the coffee.

*Example II*

348 parts of toluene diisocyanate (mixed isomers, as in Example I) were reacted with 8 parts of N-methylmorpholine and 8 parts of water (representing an NCO:OH ratio of 4:1) in the manner described in Example I. The viscosity increased steadily as the water was added. The resulting reaction product, a viscous resinous mass, was then dissolved in a sufficient quantity of dimethyl formamide to give a solution containing 10% of the reaction product. Said solution was then applied to a commercially available melamine-formaldehyde tea cup. After air drying, the cup was placed in an air oven at 80° C. for 20 minutes to cure the resinous film. The treated cup and an untreated cup of the same type were then exposed to the strong brew of black coffee in the manner of Example I. After 144 hours, the untreated cup had stained severely and was dark brown in color, while the treated cup was unstained and retained its original color.

*Example III*

5 grams of N,N'-bis-(4-methyl-3-isocyanato) phenylurea were dissolved in 100 grams of dimethyl formamide. Melamine-formaldehyde mouldings of the type described in Example I were coated with this solution and after air drying were heated in a hot air oven at 120° C. for 10 minutes. The treated pieces were then exposed to the accelerated coffee staining test described in Example I. After a period of 72 hours, the treated pieces showed an excellent degree of stain-resistance.

It will be obvious that other changes and variations may be made in carrying out the present invention without departing from the spirit and scope thereof as defined in the appended claims.

We claim:

1. A heat- and pressure-consolidated article prepared from an aminoplast resinous composition selected from the group consisting of an aminotriazine-aldehyde resinous composition and a urea-aldehyde resinous composition and coated with a hard, stain-resistant, cured, adherent film comprising a resinous reaction product of (1) a toluene diisocyanate and (2) a water, the mol ratio of said (1) to said (2) being from about 2:1 to 6:1, respectively.

2. A heat- and pressure-consolidated article prepared from an aminoplast resinous composition selected from the group consisting of an aminotriazine-aldehyde resinous composition and a urea-aldehyde resinous composition and coated with a hard, stain-resistant, cured, adherent film comprising a resinous reaction product of (1) a mixture of isomeric toluene diisocyanates and (2) water, the mol ratio of said (1) to said (2) being from about 2:1 to 6:1, respectively.

3. A heat- and pressure-consolidated article prepared from an aminoplast resinous composition selected from the group consisting of an aminotriazine-aldehyde resinous composition and a urea-aldehyde resinous composition and coated with a hard, stain-resistant, cured, adherent film comprising a resinous reaction product of (1) 2,4-toluene diisocyanate and (2) water, the mol ratio of said (1) to said (2) being from about 2:1 to 6:1, respectively.

4. A heat- and pressure-consolidated article prepared from an aminoplast resinous composition selected from the group consisting of an aminotriazine-aldehyde resinous composition and a urea-aldehyde resinous composition and coated with a hard, stain-resistant, cured, adherent film comprising a resinous reaction product of (1) 2,6-toluene diisocyanate and (2) water, the mol ratio of said (1) to said (2) being from about 2:1 to 6:1, respectively.

5. A heat- and pressure-consolidated article prepared from an aminoplast resinous composition selected from the group consisting of an aminotriazine-aldehyde resinous composition and a urea-aldehyde resinous composition and coated with a hard, stain-resistant, cured, adherent film comprising a resinous reaction product of (1) a mixture of 2,4- and 2,6-toluene diisocyanates and (2) water, the mol ratio of said (1) to said (2) being from about 2:1 to 6:1, respectively.

6. A heat- and pressure-consolidated article prepared from an aminotriazine-aldehyde resinous composition and coated wtih a hard, strain-resistant, cured, adherent film comprising a resinous reaction product of (1) a toluene diisocyanate and (2) water, the mol ratio of said (1) to said (2) being from about 2:1 to 6:1, respectively.

7. A heat- and pressure-consolidated article prepared from a melamine-formaldehyde resinous composition and coated with a hard, stain-resistant, cured, adherent film comprising a resinous reaction product of (1) a toluene diisocyanate and (2) water, the mol ratio of said (1) to said (2) being from about 2:1 to 6:1, respectively.

8. A heat- and pressure-consolidated article prepared from a urea-aldehyde resinous composition and coated with a hard, stain-resistant, cured, adherent film comprising a resinous reaction product of (1) a toluene diisocyanate and (2) water, the mol ratio of said (1) to said (2) being from about 2:1 to 6:1, respectively.

9. A heat- and pressure-consolidated article prepared from an aminotriazine-aldehyde resinous composition and coated with a hard, stain-resistant, cured, adherent film comprising a resinous reaction product of (1) a mixture of isomeric toluene diisocyanates and (2) water, the mol ratio of said (1) to said (2) being from about 2:1 to 6:1, respectively.

10. A heat- and pressure-consolidated article prepared from a melamine-formaldehyde resinous composition and coated with a hard, stain-resistant, cured, adherent film comprising a resinous reaction product of (1) a mixture of isomeric toluene diisocyanates and (2) water, the mol ratio of said (1) to said (2) being from about 2:1 to 6:1, respectively.

11. A heat- and pressure-consolidated article prepared from a urea-aldehyde resinous composition and coated with a hard, stain-resistant, cured, adherent film comprising a resinous reaction product of (1) a mixture of isomeric toluene diisocyanates and (2) water, the mol ratio of said (1) to said (2) being from about 2:1 to 6:1, respectively.

12. A heat- and pressure-consolidated article prepared from a melamine-formaldehyde resinous composition and coated with a hard, stain-resistant, cured, adherent film comprising a resinous reaction product of (1) 2,4-toluene diisocyanate and (2) water, the mol ratio of said (1) to said (2) being from about 2:1 to 6:1, respectively.

13. A heat- and pressure-consolidated article prepared from a melamine-formaldehyde resinous composition and coated with a hard, stain-resistant, cured, adherent film comprising a resinous reaction product of (1) 2,6-toluene diisocyanate and (2) water, the mol ratio of said (1) to said (2) being from about 2:1 to 6:1, respectively.

14. A heat- and pressure-consolidated article prepared from a melamine-formaldehyde resinous composition and coated with a hard, stain-resistant, cured, adherent film comprising a resinous reaction product of (1) a mixture of 2,4- and 2,6-toluene diisocyanates and (2) water, the mol ratio of said (1) to said (2) being from about 2:1 to 6:1, respectively.

15. A process for the preparation of a stain-resistant article which comprises (A) applying, to a heat- and pressure-consolidated article prepared from an aminoplast resinous composition selected from the group consisting of an aminotriazine-aldehyde resinous composition and a urea-aldehyde resinous composition, a coating comprising the resinous reaction product of (1) a toluene diisocyanate and (2) water, dissolved in a suitable organic solvent, the mol ratio of said (1) to said (2) being from about 2:1 to 6:1, respectively, (B) air drying the resulting coated article to evaporate said solvent, and (C) heating the dried, coated article at temperatures between about 50 and 150° C. for a period of time ranging from about 2 to 20 minutes to cure the coating to a hard, stain-resistant adherent film.

16. A process for the preparation of a stain-resistant article which comprises (A) applying, to a heat- and pressure-consolidated article prepared from an aminoplast resinous composition selected from the group consisting of an aminotriazine-aldehyde resinous composition and a urea-aldehyde resinous composition, a coating comprising the resinous reaction product of (1) a mixture of isomeric toluene diisocyanates and (2) water, dissolved in a suitable organic solvent, the mol ratio of said (1) to said (2) being from about 2:1 to 6:1, respectively, (B) air drying the resulting coated article to evaporate said solvent, and (C) heating the dried, coated article at temperatures between about 50 and 150° C. for a period of time ranging from about 2 to 20 minutes to cure the coating to a hard, stain-resistant adherent film.

17. A process for the preparation of a stain-resistant article which comprises (A) applying, to a heat- and pressure-consolidated article prepared from an aminoplast resinous composition selected from the group consisting of an aminotriazine-aldehyde resinous composition and a urea-aldehyde resinous composition, a coating comprising the resinous reaction product of (1) 2,4-toluene diisocyanate and (2) water, dissolved in a suitable organic solvent, the mol ratio of said (1) to said (2) being from about 2:1 to 6:1, respectively, (B) air drying the resulting coated article to evaporate said solvent, and (C) heating the dried, coated article at temperatures between about 50 and 150° C. for a period of time ranging from about 2 to 20 minutes to cure the coating to a hard, stain-resistant adherent film.

18. A process for the preparation of a stain-resistant article which comprises (A) applying, to a heat- and pressure-consolidated article prepared from an aminoplast resinous composition selected from the group consisting of an aminotriazine-aldehyde resinous composition and a urea-aldehyde resinous composition, a coating comprising the resinous reaction product of (1) a mixture of 2,4- and 2,6-toluene diisocyanates and (2) water, dissolved in a suitable organic solvent, the mol ratio of said (1) to said (2) being from about 2:1 to 6:1, respectively, (B) air drying the resulting coated article to evaporate said solvent, and (C) heating the dried, coated article at temperatures between about 50 and 150° C. for a period of time ranging from about 2 to 20 minutes to cure the coating to a hard, stain-resistant adherent film.

19. A process for the preparation of a stain-resistant article which comprises (A) applying, to a heat- and pressure-consolidated article prepared from a melamine-formaldehyde resinous composition, a coating comprising the resinous reaction product of (1) 2,4-toluene diisocyanate and (2) water, dissolved in a suitable organic solvent, the mol ratio of said (1) to said (2) being from about 2:1 to 6:1, respectively, (B) air drying the resulting coated article to evaporate said solvent, and (C) heating the dried, coated article at a temperature between about 50 and 150° C. for a period of time ranging from about 2 to 20 minutes to cure the coating to a hard, stain-resistant adherent film.

20. A process for the preparation of a stain-resistant article which comprises (A) applying, to a heat- and pressure-consolidated article prepared from a melamine-formaldehyde resinous composition, a coating comprising the resinous reaction product of (1) a mixture of 2,4- and 2,6-toluene diisocyanates and (2) water, dissolved in a suitable organic solvent, the mol ratio of said (1) to said (2) being from about 2:1 to 6:1, respectively, (B) air drying the resulting coated article to evaporate said solvent, and (C) heating the dried, coated article at temperatures between about 50 and 150° C. for a period of time ranging from about 2 to 20 minutes to cure the coating to a hard, stain-resistant adherent film.

References Cited in the file of this patent

UNITED STATES PATENTS 2,333,914    Berchet _____ Nov. 9, 1943

FOREIGN PATENTS 696,029    Great Britain _____ Aug. 9, 1953